(12) United States Patent
Genda

(10) Patent No.: US 8,045,223 B2
(45) Date of Patent: Oct. 25, 2011

(54) IMAGE FORMATION WITH PREVENTION OF TRACING PATTERN FROM BEING NOTICEABLE ON EDGES OF STACKED MEDIA

(75) Inventor: Daisuke Genda, Saitama (JP)

(73) Assignee: Konica Minolta Business Technologies, Inc. (JP)

( * ) Notice: Subject to any disclaimer, the term of this patent is extended or adjusted under 35 U.S.C. 154(b) by 673 days.

(21) Appl. No.: 12/014,976

(22) Filed: Jan. 16, 2008

(65) Prior Publication Data
US 2008/0225339 A1    Sep. 18, 2008

(30) Foreign Application Priority Data

Mar. 15, 2007   (JP) ................. 2007-066416

(51) Int. Cl.
*H04N 1/387*  (2006.01)
*G06K 15/02*  (2006.01)
*B41M 3/10*   (2006.01)

(52) U.S. Cl. ....... 358/1.9; 358/3.28; 358/1.14; 358/1.18
(58) Field of Classification Search .......... 358/1.9, 358/3.28, 1.14, 1.18, 448, 449, 450, 452, 358/453, 537, 538, 304; 283/36, 901, 902; 399/366, 384, 385, 407; 382/282, 283, 284, 382/294

See application file for complete search history.

(56) References Cited

U.S. PATENT DOCUMENTS

| | | | | |
|---|---|---|---|---|
| 6,753,977 | B2* | 6/2004 | Hoover | 358/1.9 |
| 2006/0044592 | A1* | 3/2006 | Wakana | 358/1.14 |
| 2008/0226368 | A1* | 9/2008 | Morishita | 399/366 |
| 2009/0109492 | A1* | 4/2009 | Hikosaka | 358/3.28 |
| 2009/0109493 | A1* | 4/2009 | Takahashi | 358/3.28 |
| 2009/0110290 | A1* | 4/2009 | Nishimachi | 358/1.13 |
| 2009/0231632 | A1* | 9/2009 | Kikuchi | 358/448 |

FOREIGN PATENT DOCUMENTS

| | | |
|---|---|---|
| JP | 4-294682 | 10/1992 |
| JP | 2002-271603 | 9/2002 |
| JP | 2003-95533 | 4/2003 |
| JP | 2004-304597 | 10/2004 |
| JP | 2006-87042 | 3/2006 |
| JP | 2006-165977 | 6/2006 |

OTHER PUBLICATIONS

English machine translation of JP 2002-271603 published Sep. 20, 2002.*
Japanese Office Action for Japanese Patent Application No. 2007-066416 mailed May 20, 2008.

* cited by examiner

*Primary Examiner* — Scott A Rogers
(74) *Attorney, Agent, or Firm* — Cantor Colburn LLP

(57) ABSTRACT

An image forming apparatus to carry out image forming on a recording medium by adding a specific pattern to image data inputted, having a mask creation section to create a mask area where addition of the specific pattern is prohibited and a control section to carry out image forming in a way that addition of the specific pattern is prohibited in the mask area.

13 Claims, 4 Drawing Sheets

CUTTING REGISTER MARK  2-REPEAT  PERFORATION

IMAGE FORMATION WITH PREVENTION OF TRACING PATTERN FROM BEING NOTICEABLE ON EDGES OF STACKED MEDIA

This application is based on Japanese Patent Application No. 2007-066416 filed on Mar. 15, 2007, in Japanese Patent Office, the entire content of which is hereby incorporated by reference.

BACKGROUND OF THE INVENTION

The present invention relates to an image forming apparatus and an image forming system.

In recent years, in color multi-function copying machines and color printers, a specific pattern (prosecution patter), which human cannot recognize, is added to an outputted matter so as to prosecute a source of the matter when copying a prohibited document such as a paper currency or a document of value is copied.

On the other hand, the above color image forming apparatuses have been used as digital printing machines in a field of printing a wide variety in small quantity (high-mix low-volume printing), and a system provided with a post-processing apparatus having functions of perforation, stitching, folding and cutting is becoming popularly. (for example, Patent Document 2)

Patent Document 1: Tokkaihei 4-294682
Patent Document 2: Tokkai 2003-95533

In case post-processing is carried out for the outputted matter having the specific pattern, it was found that the following problems occur.

For example, in case a plurality of the outputted matters are stacked and cut, the specific patterns formed in the same position of respective outputted matters forms lines which are noticeable on a cutting surface. Also, for example, in case the plurality of the outputted matters are folded and stacked, the specific patterns formed in the same position of respective outputted matters are connected and forms the line which are noticeable.

SUMMARY OF THE INVENTION

In view of the above problems, an object of the present invention is to provide an image forming apparatus and an image forming system where a noise caused by the specific pattern does not occur in the output matters having the specific pattern.

An image forming apparatus of the present invention is characterized in that the image forming apparatus, to carry out image forming on a recording medium by adding a specific pattern to image data inputted, has a mask creation section to create a mask area where adding of the specific pattern is prohibited and a control section to carry out image forming in a way that addition of the specific pattern is prohibit in the mask area.

Also the image forming system of the present invention is characterized in that the image forming system has the image forming apparatus of the present invention and a post-processing apparatus to carry out post-processing for the recording medium where the image is formed by the image forming apparatus.

DETAILED DESCRIPTION OF THE PREFERRED EMBODIMENT

The following describes embodiments based on the drawings, without the present invention being restricted thereto:

(System Structure)

Figure 1:
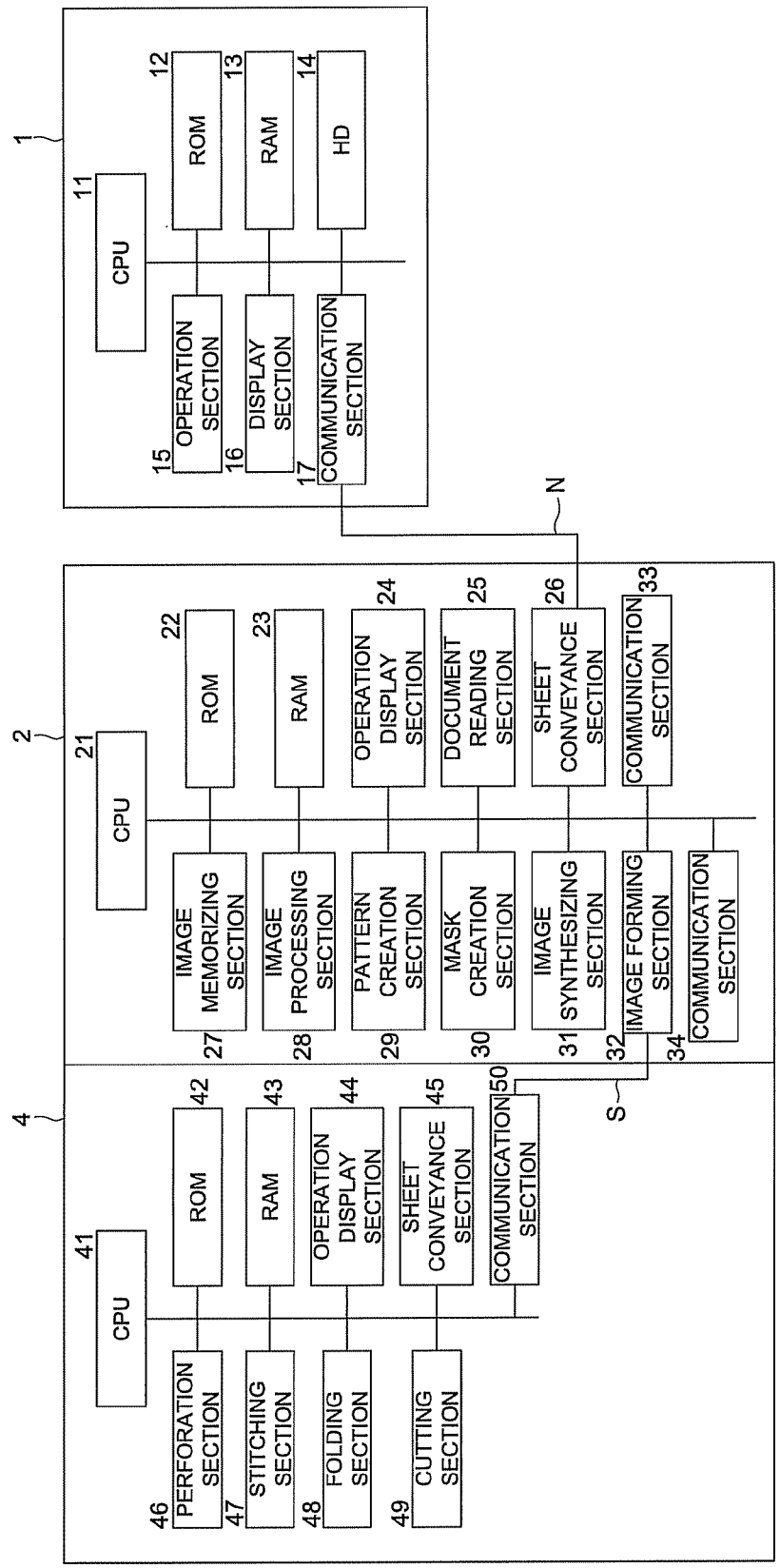
FIG. 1 is a configuration diagram of an image forming system related to the present invention.

FIG. 1 is a configuration diagram of an image forming system related to the present embodiment. The image forming system is configured with a PC (personal computer) 1, an image forming apparatus 2, and a post-processing apparatus 4

The PC 1 and the image forming apparatus 2 are able to communicate each other via a network circuit N such as a LAN. To the image forming apparatus 2, the post-processing apparatus 4 is connected, and the post-processing apparatus 4 receives a recording medium (hereinafter may called sheet) discharged from the image forming apparatus 2 and carries out post-processing. Also, the image forming apparatus 2 and the post-processing apparatus 4 are configured to be able communicate each other via a communication circuit S which employs, for example, a serial transmission method.

(Configuration of PC 1)

The PC 1 is configured with a CPU 11, a ROM 12, a RAM 13, and a HD (hard disk) 14, an input section 15 such as a key board and a mouse, a display section 16 such as a liquid crystal display, and a communication section 17 such as a LAN card.

In HD 14, an application software to create an image data, an imposition software to impose the image data, and a printer driver are installed and memorized.

The image data created by the application software is imposed by the imposition software, and converted by the printer driver into processable data by the image forming apparatus 2, thereafter it is transmitted to the image forming apparatus 2 via the communication section 17.

Also, besides the image data, control information set by the imposition software and the printer driver is transmitted. For example, position information such as the cutting register mark, folding register mark and perforation position mark set in the imposition software, post-processing information (perforation, stitching, folding and cutting) and image layout information (repeat, Nin 1) are transmitted. Further, PC related information such as a name of the PC, log in name to the PC.

(Configuration of Image Forming Apparatus 2)

The Image forming apparatus 2 is configured with a ROM 22 to memorize a control program and data, a CPU 21 representing a control section of the present invention to execute control of the image forming apparatus 2 in accordance with the control program, a RAM 23 which CPU 21 uses as a work area and the following components.

An operation display section 24 is configured with a touch panel through which a user sets various image forming conditions and post-processing conditions.

A document reading section 25 reads an image of a document placed by the user and outputs image data.

A sheet conveyance section 2G conveys the sheet towards an image forming section 32 and conveys the sheet on which the image has been formed towards the post-processing apparatus 4.

An image memory section 27 memorizes the image data transmitted from the PC1 or the document reading section 25 and image data after being created by processing the aforesaid data through an image processing section 28 or an image synthesizing section 31.

The image processing section 28 carries out various image processing for the image data transmitted from the PC 1 or the document reading section 25.

A pattern creation section 29 creates the specific pattern for tracing based on a serial number of the image forming apparatus 2, current time and data, the name of the PC and the log in name of the PC.

A mask creation section 30 creates a mask area for the aforesaid specific pattern based on the control information transmitted from the PC 1 and setting information of the image forming conditions or the post-processing conditions set in the operation display section 24.

The image synthesizing section 31 creates synthesized data by synthesizing the image data processed by the image processing section 28, the specific pattern created by the pattern creation section 29 and the mask area created by the mask creation section 30.

The image forming section 32 forms an image on the sheet conveyed from the sheet conveyance section 26 based on the image data synthesized by the image synthesizing section 31.

The communication section 33 receives the image data transmitted from the PC 1 and the control information. The communication section 33 functions as an input section of the present invention to which the post-processing information and the image layout information are inputted.

The communication section 34 transmits the control information about the post-processing transmitted from the PC 1 and the control information about post-processing set through the operation display section 24 to the post-processing apparatus 4.

(Configuration of the Post Processing Apparatus 4)

The post-processing apparatus 4 is configured with a ROM 42 to memorize the control program and data, a CPU 41 to execute control of the post-processing apparatus 4 according to the control program, a RAM 43 which the CPU 41 uses as a work area and the following components.

In an operation display section 44, setting of the post-processing conditions when the post-processing is carried out manually is carried out and execution of the post-processing is instructed.

A sheet conveyance section 45 receives the sheet from the image forming apparatus 2 and sends it to a perforation section 46, a stitching section 47, a folding section 48 and a cutting section 49.

The perforation section 46 carries out so called perforation on the sheet.

The stitching section 47 stacks the conveyed sheets to make a sheet bundle then stitches the sheet bundle by staple needles.

The folding section 48 folds the sheet bundle in the middle, or folds one piece of the sheet into two, three or in a shape of Z.

The cutting section 49 cuts the sheet bundle or a piece of the sheet.

The communication section 50 receives the information about the post-processing transmitted from the image forming apparatus 2.

(Outline of Image Forming)

Figure 2:
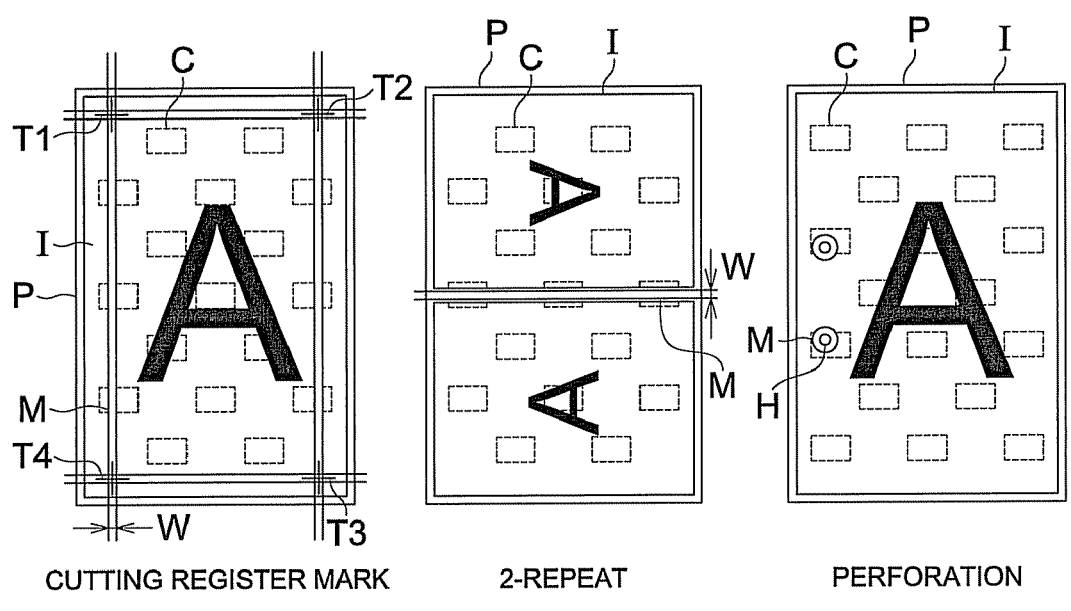
FIG. 2(a) is a schematic drawing showing an outline of image forming related to the present invention in case cutting register marks are set.
FIG. 2(b) is a schematic drawing showing an outline of image forming related to the present invention in case "2-repeat" is set.
FIG. 2(c) is a schematic drawing showing an outline of image forming related to the present invention in case perforation is set.

FIG. 2 is a schematic diagram showing an outline of image forming related to the present embodiment.

FIG. 2(*a*) shows a case where the cutting register marks are being set. An image area I is arranged within the sheet P and the image data and the specific pattern C are formed within the aforesaid image area I. The specific pattern C is repeatedly formed as a plurality of patterns across a whole surface of the image area I. Also, in the image area I, four cutting register marks T1 to T4 to show predetermined cutting positions are shown. The cutting is performed for four sides between T1 to T2, T2 to T3, T3 to T4 and T4 to T1. Areas having a predetermined width of W along the four sides are assigned as mask areas M where adding of the specific pattern C is prohibited. In the mask area M, image data is formed as an image, however the specific pattern C is not formed as an image. The predetermined width W is appropriately determined considering variations of the cutting positions due to mechanical errors of the apparatus.

As above, by providing the mask area M so as to cover the four sides to be cut, the specific pattern C does not appear to the cutting edge. As the result, the noise caused by the specific pattern C does not occur at the cutting edge.

FIG. 2(*b*) shows a case where 2-repeat is set. 2-repeat means that two same images are allocated and formed within the sheet P. In 2-repeat image, since the sheet P is likely to be used after cutting into half, the mask area M where addition of the specific patter C is prohibited is provided at a center section of the sheet P. Naturally, a four pieces layout is possible without being limited to two pieces layout. In case of the four pieces layout, the mask areas M where addition of the specific pattern C is prohibited are allocated at the center section in both lateral and longitudinal directions.

Thereby, though the sheet P is cut, the specific patters C do not appear at the cutting edge and the noise caused by the specific patterns does not occur.

FIG. 2(*c*) shows a case where the perforation is carried out. The mask areas M in which addition of the specific pattern C is prohibited are provided around the periphery of the predetermined perforation positions H.

Thereby, even if perforation is performed at the predetermined perforation positions H, the specific pattern C do not appear at the edges of holes and the noise caused by the specific patterns does not occur.

Without being limited to the above cases, in case cutting, folding or perforation is carried or possibly carried out, the mask areas M is allocated so as to include the cutting edge, the folding line and the edge of the hole.

In case a plurality of the sheets are saddle stitched or center folded and cut to make a booklet, The more inside a sheet locates, the farther a cutting position recedes from the edge. It is preferred to take account of the above when the mask areas M are determined on each sheet. Also, in case of center folding and saddle stitching, since the folding line of the sheet inside and the folding line inside the outermost sheet are not conspicuous much, the specific pattern C can be formed without providing the mask area M.

(Control Flow)

Figure 3:
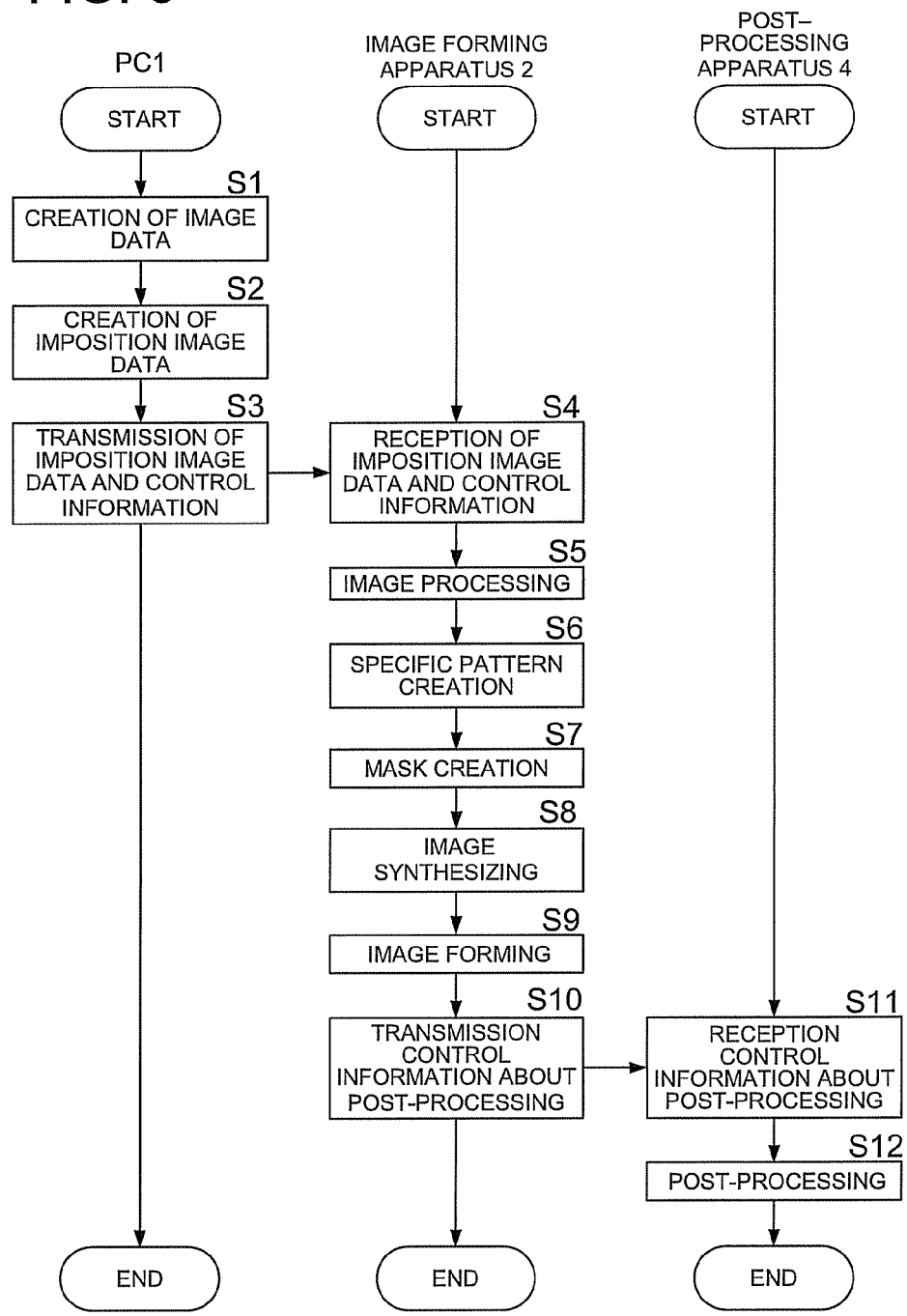
FIG. 3 is a control flow chart of an image forming system related to the present invention.

FIG. 3 is a control flow chart of the image forming system related to the present embodiment. As an example, a case where the image data is inputted from the PC 1 is shown. Now, descriptions are given mainly along an example of FIG. 2(*a*).

Firstly, in the PC 1 a user boots up an application software installed in the HD 14 and carries out inputs of texts and pasting images using the operation section 15 and the display section 16, then the CPU 11 creates an image data (Step S1).

Next the user boosts up an imposition software installed in the HD 14 to open the image data created in the Step S1 and carries out inputting for imposition using the operation section 15 and the display section 16, then the CPU 11 creates imposition image data (Step S2).

In the example in FIG. 2(*a*), by setting the cutting register marks T1 to T4 on the imposition software, the CPU 11 creates image data where the cutting register marks T1 to T4 are added to the image data created in the Step S1. Also, at this stage, positioning information of each cutting register mark is created as control information.

Next, when the user instructs printing on the imposition software, the CPU 11 boots up a printer driver, and converts the imposition image data and the control information set by the imposition software and the printer driver into data capable of being processed by the image forming apparatus 2 and transmit it to the image forming apparatus 2 via communication section 17 (Step S3). When is occurs, the PC related information such as the name of the PC and the log in name to the PC is transmitted as the control information.

In the example of FIG. 2(*a*), when cutting register marks T1 to T4 are set on the imposition software, the printer driver automatically sets "cutting mode". Then the position information of the cutting register marks T1 to T4, setting information of "cutting" mode, PC related information and sheet size information are transmitted to the image forming apparatus 2 as the control information.

On the other hand, in case of examples in FIG. 2(*b*) and FIG. 2(*c*), since the imposition software is not particularly necessary, after creating the image data in the Step S1, the print instruction is given on the application software. When the printing instruction is given, CPU 11 boots up the printer driver and displays a printer driver screen on the display section 16. When this occurs, the user sets "2-repeat" mode and "perforation" mode respectively on the printer driver screen. Thereby, in the example of FIG. 2(*b*), an image in which two pieces of image data is allocated is created as the imposition data, and in the example of FIG. 2(*c*) the image data created in the Step S1 is created as the imposing image data as it is.

Then, the CPU 11 converts the control information such as the imposition image data, each mode setting information set in the printer driver, the sheet size information and the PC related information into data capable of being processed by the image forming apparatus 2 and transmits to the image forming apparatus 2 via the communication section 17.

Next, a CPU 21 of the image forming apparatus 2 receives the control information and the imposition image data transmitted from the Step S3 via the communication section 33 (Step S4).

Next, the CPU 21 inputs the received imposition image data to the image processing section 28 to make the image processing section 28 carry out various image processing (Step S5).

Next, the CPU 21 inputs a serial number of the image forming apparatus 2, current data and time, the name of PC, the log in name to the PC into the pattern forming section 29 and creates the specific pattern C including information thereof in the pattern creation section 29 (Step S6). The serial number is, for example, memorized in the ROM 22 in advance. The current data and time is obtained from an unillustrated timer provided in the image forming apparatus 2. The PC name and the log in name to the PC are obtained from the control information received from the PC 1.

Next, the CPU 21 inputs the control information necessary for creating the mask among the control information transmitted from the PC 1 into the mask creation section 30, and creates a mask area corresponding to the specific pattern C in the mask creation section 30 (Step S7).

In the example of FIG. 2(*a*), the position information of the cutting register marks T1 to T4, setting information of "cutting" mode, and the sheet size information are inputted in the mask creation section 30. Thereby, the mask area M can be allocated so as to include the predetermined cutting positions between the register marks.

In the example of FIG. 2(*b*), setting information of the "2-repeat mode" and sheet size information are inputted to mask creation section 30. Thereby it becomes possible that the mask area M is allocated at the center section of the 2-repeat image namely the center section of the sheet.

In the example of FIG. 2(*c*), the setting information of "perforation" mode and the sheet size information are inputted into the mask creation section 30. Thereby, the mask area M can be allocated around the periphery of the predetermined perforation positions H.

Next, the CPU 21 inputs the imposition image data of the image processing section 28, the specific pattern C of the pattern creation section 29 and each data of the mask area M of the mask creation section 30 into the image synthesizing section 31 and combines the data thereof in the image synthesizing section 31 (Step S8). The image synthesizing section 31 carries out, for example, "AND operation" of the specific pattern C and the mask area M then carries out "OR operation". Thereby in the mask area M, only the imposition image data is formed without forming the specific pattern C.

Next, the CPU 21 inputs the image data synthesized in the Step S8 into the image forming section 32 and carries out image forming on the sheet conveyed from the sheet conveyance section 26 in the image forming section 32 (Step S9). The sheet on which the image is formed is conveyed towards the post-processing apparatus 4.

Next, the CPU 21 transmits the information about post-processing to the post-processing apparatus 4 via the communication section 34 (Step S10). Thereby, the control information such as the kind of post-processing e.g. perforation, stitching, folding and cutting; a position in which the post-processing is applied on the sheet; and the sheet size information are transmitted.

Next, the CPU 41 of the post-processing apparatus 4 receives the control information about post-processing sent from the image forming apparatus 2 in the Step S10 via the communication section 50 (Step S11).

Next, the CPU 41 makes relevant post-processing apparatus among the perforation section 46, the stitching section 47, the folding section 48 and the cutting section 49 to carry out post-processing based on the received control information about post-processing (Step 12).

Figure 4:
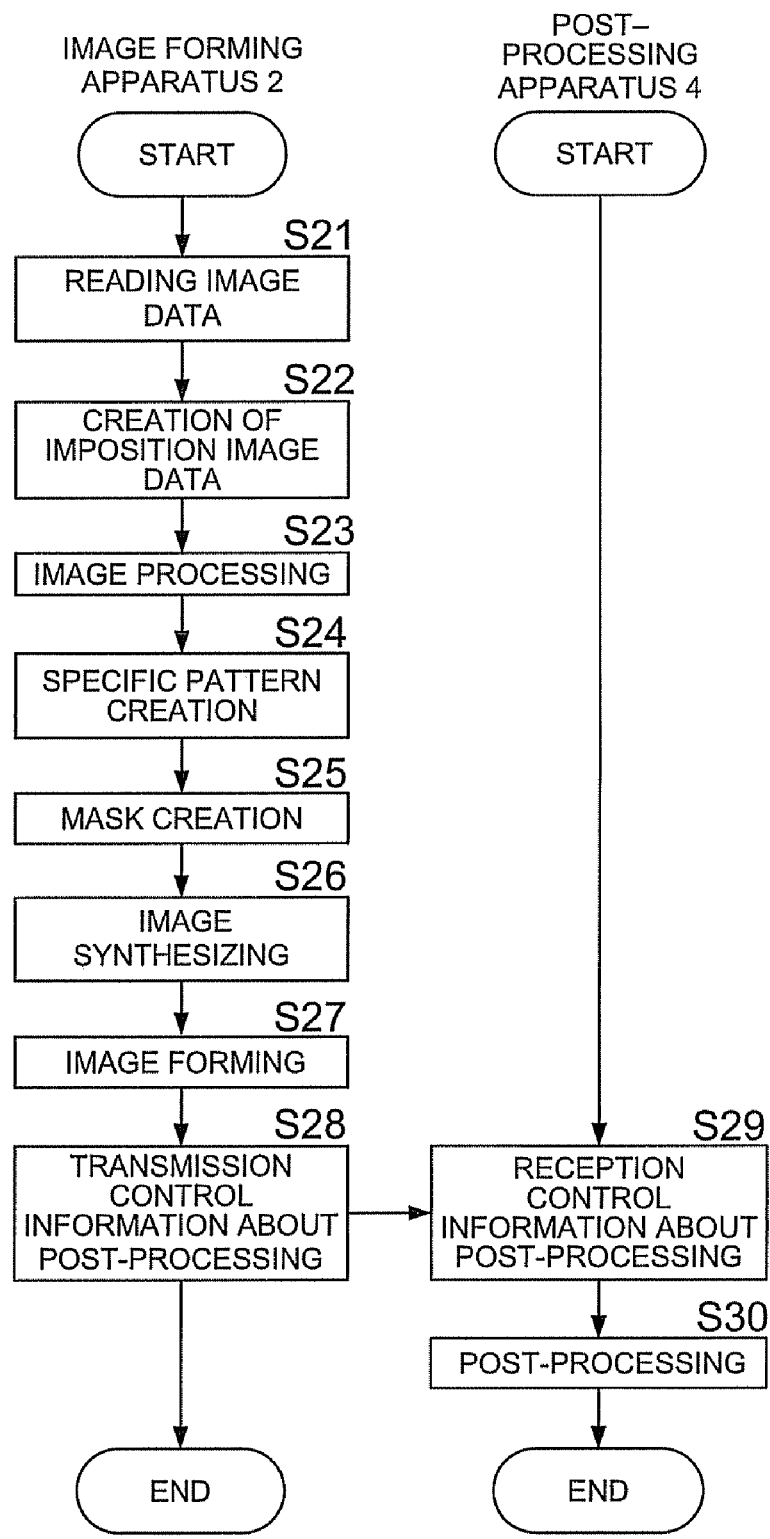
FIG. 4 is another example of a control flow chart of an image forming system related to the present invention.

FIG. 4 is another example of a flow chart of control of an image forming system related to the present invention. In the flow chart of FIG. 3, a case where the imposition image data is created by the imposition software installed in the PC 1 is shown. Contrarily in the flow chart in FIG. 4, a case where the imposition image data is created in the image forming apparatus 2 is shown. Meanwhile, as an example, a case of using the image data memorized in the image memory section 27 in advance is shown. The redundant description with that in the flow chart in FIG. 3 is omitted appropriately.

Firstly, the user operates the operation display section 24 of the image forming apparatus 2 to select a subject image data and the CPU 21 reads the image data thereof from the image memory section 27 (Step S21).

Next, the user carries out mode setting of "cutting" mode, "2-repeat" mode or "peroration" mode, and the CPU 21 creates a corresponding imposition image data (Step S22).

In the example of FIG. 2(a), if the user sets the cutting register marks T1 to T4 in the "cutting" mode, the CPU 21 creates an imposition image data where the images of cutting register marks T1 to T4 to are added to the image data read in the Step S21. At the same time, the position information of the cutting register marks is created as the control information.

In the example of FIG. 2(b), if the user sets "2-repeat" mode, the CPU 21 creates imposition image data where the image data read in the Step S21 is allocated at two positions.

In the example of FIG. 2(c), if the user sets "perforation" mode, the CPU 21 creates the image data read in the Step S21 as it is as the imposition data.

Next, the CPU 21 inputs the received imposition image data into the image processing section 28 and make the image processing section 28 to carry out various image processing (Step S23).

Next, the CPU 21 inputs the serial number of the image forming apparatus 2, and current data and time into the pattern creation section 29 and makes the pattern creation section 29 to create the specific pattern C including the information thereof (Step S24).

Next, the CPU 21 inputs the control information necessary for creating the mask among the control information inputted from the operation display section 24 into the mask creation section 30 and makes the mask creation section 30 to create a mask area corresponding to the specific pattern C (Step S25).

Next, the CPU 21 inputs the imposition image data of the image processing section 28, and each data of the specific pattern C of pattern creation section 29 and the mask area M of the mask area creation section 30 into the image synthesizing section 31, and makes the image synthesizing section 31 to synthesize the data thereof (Step S26).

Next, the CPU 21 inputs the image data synthesized in the Step S26 into the image forming section 32 and makes the image forming section 32 to carry out image forming on the sheet conveyed from the sheet conveyance section 26 (Step S27). The sheet on which the image is formed is conveyed towards the post-processing apparatus 4.

Next, the CPU 21 transmits the control information about post-processing to the post-processing apparatus 4 via the communication section 34 (Step S28).

Next, the CPU 41 of the post-processing apparatus 4 receives the control information about post-processing transmitted from the image forming apparatus 2 via the communication section 50 in the Step S28 (Step S29).

Next, the CPU 41 makes the relevant post-processing apparatus among the perforation section 46, the stitching section 47, the folding section 48 and the cutting section 49 to carry out post-processing based on the control information about post-processing received (Step 30).

As described above, according to the present embodiment, the specific pattern C does not appear at the cutting edge, the folding line or the edge of perforation and the noise caused by the specific pattern C does not occur.

Meanwhile, as described above, the contents of the description in the above embodiments are examples of the image forming system related to the present invention and the present invention is not limited to the examples thereof. Thus the following modifications are possible.

In the present embodiment, the position information of the cutting register marks T1 to T4 is stored as the control information in the image forming apparatus 2 separately from the image data, however the position information of the register marks T1 to T4 can be extracted by recognizing the register marks within the image data.

In the present embodiment, the image data is inputted from the PC 1, however it can be inputted from the document reading section 25 of the image forming apparatus 2. In this case, the control information is created based on an input from the operation display section 24 of the image forming apparatus 2. The control display section 24 functions as the input section of the present invention.

In the present embodiment, a case where the cutting register marks are provided to carry out cutting is shown, however in case that the cutting is carried out without providing the register marks, the mask areas are still allocated at the cutting edges in the same manner.

In the present embodiment, while the cases of the cutting register marks have been described, a case of the folding register marks can be described in the same manner.

In the present embodiment, while the case where an ordinary paper is used is shown, in case special sheets such as a sheet having perforations lines for continuous form paper or sprocket holes for feeding and a sheet where perforations or perforation position marks are provide in advance are used, it is preferred that areas including the perforation line, the sprocket hole, perforation and peroration position mark are set as the mask areas so that the specific pattern c is not added. For the positions of the areas thereof, their position coordinates can be inputted directly in advance or the positions can be obtained by reading them in the sheet.

In the present invention, while the cases where the post-processing apparatus 4 is connected to the image forming apparatus 2, and the image forming and the post-processing are carried out in the same operation are shown, it can be applied in a case where the image forming apparatus and the post-processing apparatus are disposed independently and the user brings out the sheet on which the image is formed and sets it at the post processing apparatus. In this case, the image forming apparatus is configured to be capable of setting the information about post-processing, and the information about post-processing is set in advance when the image forming is carried out in consideration for the post-processing carried out in the post-processing apparatus.

According to the above embodiments, the specific pattern does not appears on the cutting edge, the folding line or the perforation edge and the noise caused by the specific pattern does not occur.

What is claimed is:

1. An image forming apparatus to form an image on a recording medium by adding a specific pattern, which is barely-noticeable, to image data inputted, comprising:
   a mask creation section to create a mask area in which addition of the specific pattern is prohibited so as to prevent the specific pattern from becoming noticeable at side edges of the recording media when the recording media are stacked;
   a control section to carry out image forming in a way that addition of the specific pattern is prohibited in the mask area; and
   an input section to which post-processing information for the recording medium is inputted,
   wherein the mask creation section sets the mask area based on the post-processing information.

2. The image forming apparatus of claim 1, wherein the post-processing information is of a predetermined position of cutting the recording medium.

3. The image forming apparatus of claim 1, wherein the post-processing information is of a predetermined position of folding the recording medium.

4. The image forming apparatus of claim 2, wherein the predetermined position of cutting the recording medium is indicated by a register mark.

5. The image forming apparatus of claim 3, wherein the predetermined position of folding the recording medium is indicated by a register mark.

6. The image forming apparatus of claim 1, wherein the post-processing information is of a predetermined position-of-perforation on the recording medium.

7. The image forming apparatus of claim 1, further comprising
an input section to which image layout information to lay out a plurality of images for the recording medium is inputted,
wherein the mask creation section sets the mask area based on the image layout information.

8. The image forming apparatus of claim 1, wherein the mask creation section sets the mask area based on a shape of the recording medium.

9. The image forming apparatus of claim 8, wherein the mask creation section sets an area including a perforation line, a sprocket hole, a perforation and a perforation position mark as the mask area for the recording medium having a perforation line, a sprocket hole, a perforation or a perforation position mark.

10. An image forming system, comprising the image forming apparatus of claim 1 and a post-processing apparatus to carry out post-processing for the recording medium on which the image forming apparatus carries out image forming.

11. An image forming method to form an image on a recording medium by adding a specific pattern, which is barely-noticeable, to image data inputted, comprising:
inputting the image data;
creating the specific pattern;
creating a mask area in which addition of the specific pattern is prohibited so as to prevent the specific pattern from becoming noticeable at side edges of the recording media when the recording media are stacked;
obtaining a synthesized data by synthesizing the specific pattern with the image data in an area other than the mask area; and
forming an image on the recording medium based on the synthesized image data;
wherein the post-processing information is inputted with the image data, and the mask area is created based on the post-processing information.

12. The image forming method of claim 11, wherein an imposition data where a plurality of images are allocated on one piece of the recording medium is inputted, and the mask area is created based on image allocation information of the imposing image data.

13. The image forming method of claim 11, wherein the mask area is created based on a shape of the recording medium.

* * * * *